United States Patent
Duke, Jr. et al.

(10) Patent No.: US 10,018,248 B2
(45) Date of Patent: Jul. 10, 2018

(54) SYNCHRONOUS BELT WITH TOUGH FABRIC

(71) Applicant: GATES CORPORATION, Denver, CO (US)

(72) Inventors: Joseph R. Duke, Jr., Elizabethtown, KY (US); Xinjian Fan, Novi, MI (US); Karla J. Bier, Columbia, MO (US); Shawn Xiang Wu, Rochester Hills, MI (US); Leslee Brown, Broomfield, CO (US)

(73) Assignee: Gates Corporation, Denver, CO (US)

( * ) Notice: Subject to any disclaimer, the term of this patent is extended or adjusted under 35 U.S.C. 154(b) by 161 days.

(21) Appl. No.: 15/218,898

(22) Filed: Jul. 25, 2016

(65) Prior Publication Data

US 2017/0030431 A1    Feb. 2, 2017

Related U.S. Application Data

(60) Provisional application No. 62/198,208, filed on Jul. 29, 2015.

(51) Int. Cl.
  *F16G 1/28*    (2006.01)
  *F16G 5/20*    (2006.01)
  (Continued)

(52) U.S. Cl.
  CPC ............. *F16G 5/20* (2013.01); *D03D 1/0094* (2013.01); *F16G 1/04* (2013.01); *F16G 1/10* (2013.01);
  (Continued)

(58) Field of Classification Search
  CPC .......... F16G 1/28; D03D 1/00; D03D 1/0094; B29D 29/08; B32B 2037/1246
  (Continued)

(56) References Cited

U.S. PATENT DOCUMENTS

| | | | | |
|---|---|---|---|---|
| 4,832,673 A | * | 5/1989 | Nagai | F16G 1/28 474/263 |
| 5,362,281 A | * | 11/1994 | Dutton | F16G 1/28 474/205 |

(Continued)

FOREIGN PATENT DOCUMENTS

| | | |
|---|---|---|
| DE | 102007062285 A1 | 6/2009 |
| DE | 102012206040 A1 | 10/2013 |

(Continued)

*Primary Examiner* — Henry Y Liu
(74) *Attorney, Agent, or Firm* — Paul N. Dunlap, Esq.; Jeffrey A. Thurnau, Esq.

(57) ABSTRACT

A belt having an elastomeric body, a tensile cord embedded therein, and a tooth fabric having an increased value of Fabric Tensile Toughness as defined herein. The Fabric Tensile Toughness may be derived from properties of the yarns making up the fabric, such as yarn linear density, yarn ultimate elongation, yarn tensile strength, yarn packing density and weave ratio. The Fabric Tensile Toughness may be greater than 60 mJ/mm$^2$. The belt may be a toothed belt of cast polyurethane with carbon fiber tensile cord. Also disclosed is a method of improving a known tooth cover fabric for a toothed power transmission belt involving selecting a different fabric having a higher Fabric Tensile Toughness than the known fabric and orienting the different fabric so the direction of highest Fabric Tensile Toughness is oriented in the longitudinal direction of the belt.

17 Claims, 2 Drawing Sheets

(51) Int. Cl.
*F16G 1/04* (2006.01)
*F16G 1/10* (2006.01)
*F16G 5/08* (2006.01)
*D03D 1/00* (2006.01)
*F16G 1/16* (2006.01)
*F16G 5/14* (2006.01)

(52) U.S. Cl.
CPC .................. *F16G 1/16* (2013.01); *F16G 1/28* (2013.01); *F16G 5/08* (2013.01); *F16G 5/14* (2013.01); *D10B 2401/063* (2013.01)

(58) Field of Classification Search
USPC .......................................................... 474/205
See application file for complete search history.

(56) References Cited

U.S. PATENT DOCUMENTS

| | | | | |
|---|---|---|---|---|
| 5,529,545 | A * | 6/1996 | Isshiki | F16G 1/28 |
| | | | | 474/205 |
| 5,540,965 | A * | 7/1996 | Nishimura | B60R 21/235 |
| | | | | 139/389 |
| 5,807,194 | A * | 9/1998 | Knutson | B29D 29/08 |
| | | | | 474/237 |
| 6,086,500 | A * | 7/2000 | Yamada | D03D 1/00 |
| | | | | 474/202 |
| 6,250,030 | B1 * | 6/2001 | Sugimoto | E01D 19/10 |
| | | | | 52/223.1 |
| 7,909,720 | B2 * | 3/2011 | Burrowes | F16G 1/28 |
| | | | | 474/205 |
| 2003/0211912 | A1 * | 11/2003 | Cesare | F16G 1/28 |
| | | | | 474/260 |
| 2004/0152551 | A1 * | 8/2004 | Okuno | D03D 1/00 |
| | | | | 474/263 |
| 2010/0075793 | A1 * | 3/2010 | Cretin | F16G 1/10 |
| | | | | 474/205 |
| 2011/0126964 | A1 | 6/2011 | Burrowes et al. | |
| 2014/0323257 | A1 * | 10/2014 | Gibson | F16G 5/08 |
| | | | | 474/261 |
| 2015/0005123 | A1 * | 1/2015 | Di Meco | F16G 1/10 |
| | | | | 474/205 |
| 2015/0111677 | A1 * | 4/2015 | Nishiyama | F16G 1/10 |
| | | | | 474/264 |
| 2015/0152590 | A1 * | 6/2015 | Knox | C08J 5/06 |
| | | | | 428/36.92 |
| 2016/0053850 | A1 * | 2/2016 | Brocke | B29D 29/08 |
| | | | | 474/205 |
| 2016/0208889 | A1 * | 7/2016 | Yoshida | C08K 5/098 |

FOREIGN PATENT DOCUMENTS

| | | |
|---|---|---|
| EP | 2072857 A2 | 6/2009 |
| EP | 2072857 A3 | 5/2011 |
| EP | 2570529 A1 | 3/2013 |
| EP | 2570698 A2 | 3/2013 |
| EP | 2072857 B1 | 10/2013 |
| EP | 2570698 A3 | 11/2014 |

* cited by examiner

SYNCHRONOUS BELT WITH TOUGH FABRIC

BACKGROUND OF THE INVENTION

This invention relates generally to improvements in synchronous or toothed belts through use of tougher tooth cover fabric designs, more particularly to use of fabrics with both high elongation and high strength in the belt longitudinal direction, and specifically to use of a fabric with a greater Fabric Tensile Toughness as defined herein.

Synchronous belts are those having teeth on at least one side designed for intermeshing with compatible grooved pulleys for positive engagement and synchronized motion or power transfer. These toothed belts generally have an elastomeric belt body with an embedded tensile cord of high tensile strength and modulus to maintain tooth pitch under tension. The tooth surface may be covered with a fabric or film to enhance wear resistance or to support the cord. Early toothed belts such as disclosed in U.S. Pat. No. 2,507,852 utilized duck, a firm, heavy plain-weave fabric. Duck and other fabrics of limited stretch required preforming of the tooth shape. Stretchable fabric was introduced in U.S. Pat. No. 3,078,206 to allow flow-through molding wherein the fabric was conformed to the tooth shape during molding as the rubber was forced through the cord line and into the mold grooves pushing the fabric ahead of it. Stretchable fabric based on high tensile-strength, crimped nylon was disclosed, for example, in U.S. Pat. No. 4,826,472. The crimping or texturing was by the false-twist method.

Special fabric adaptions were developed for particular belts as needed. U.S. Pat. No. 3,964,328 discloses fabric tooth cover with a polyethylene laminate which provides a low coefficient of friction and prevents low-viscosity, cast elastomers from penetrating to the belt surface. U.S. Pat. No. 5,362,281 discloses a fabric that was double woven with two sets of warp and weft yarns tied together in a single layer, which proved useful in 14-mm-pitch, round-toothed belts, the contents of which are hereby incorporated herein by reference.

U.S. Pat. No. 5,529,545 discloses stretch fabrics incorporating aramid fibers. Since aramid yarns are difficult to make stretchable by texturing, the stretchable yarns were formed from elastic yarns covered with aramid and nylon.

U.S. Pat. No. 8,932,165 discloses use of a relatively thicker fabric in a toothed belt for increased durability, the contents of which are hereby incorporated herein by reference.

EP 2,072,857 A2 discloses a fabric with ratio of weft mass to warp mass in the range from 3.00 to 5.17. It also discloses that at least 60% of the linear fraction of all the weft threads cover the warp threads and face the tooth-side outer side of the belt. This is reported to improve noise in toothed belts.

EP 2,570,529 A1 discloses a fabric which can be used on the working surface of ribbed belts. The fabric is woven from a thermoplastic polymer, texturized yarn and having a warp extension at 2 kg-force, 25 mm-width sample of 5-60% and a weft extension at 2 kg-force 25 mm-width sample of 40-250%. The fabric may have high bulk texturized warp and weft yarns, preferably with low modulus, with high extension/stretch and low permeability.

What is needed is improved fabric constructions to advance synchronous belt technology to higher performance levels.

SUMMARY

The present invention is directed to systems and methods which provide new fabric constructions for synchronous belts and which provide a method of choosing fabric constructions likely to provide improved synchronous belt performance.

One embodiment is a method of improving a known tooth cover fabric for a toothed power transmission belt comprising selecting a different fabric having a higher Fabric Tensile Toughness than said known fabric, oriented said different fabric so the direction of highest Fabric Tensile Toughness is oriented in the longitudinal direction of the belt. The Fabric Tensile Toughness of the different fabric may be 60 N/mm or more, or 80 N/mm or more, or 90 N/mm or more.

In some embodiments the invention relates to a belt comprising: an elastomeric body, a tensile cord embedded therein, and a tooth fabric having a Fabric Tensile Toughness of the different fabric may be 60 N/mm or more, or 80 N/mm or more, or 90 N/mm or more. The tooth fabric may have the properties of Ex. 2 or Ex. 3 as shown in Table 1 herein, or of Ex. 5, Ex. 6, or Ex. 7 as shown in Table 2. The elastomeric body may be of a vulcanized rubber or a thermoplastic elastomer or a cast elastomer, such as cast polyurethane. The tensile cord may be of carbon fiber. The belt may be in the form of a toothed belt, a flat belt, a multi-v-ribbed belt or a V-belt. The toothed belt may have a tooth pitch of 8-mm, 9.525-mm, 11-mm, 14-mm, or other pitch. The weft direction of the fabric may be arranged in the longitudinal direction of the belt.

Utilizing fabric that is twice as tough, at least in one direction, the load life of a toothed belt may be increased three-fold, and the load capacity may also be increased by approximately 15%. This means the belt may last much longer than prior designs or that the belt width may be reduced to provide a more compact and lighter belt/sprocket design while maintaining the same life. This improvement may increase the potential market to include higher load applications than currently can be served by belts. Additionally, the fabric design can maintain the appropriate fit of the belt to the current sprockets and belt profile, and the fabric can be used in the current fabric, jacket and belt manufacturing processes.

The fabric may be treated with size, adhesive treatment, laminate film or rubber coating, or combinations thereof. Such treated fabric will be referred to as "jacket" herein.

Other types of power transmission belts, including V-belts, flat belts, and multi-V-ribbed belts, often include a fabric covering on one or more surfaces, in particular on pulley contact surfaces. Such fabrics can, in various applications, increase the wear resistance, stop or inhibit the growth of cracks in rubber used in the body of the belt, enhance the belt strength or load capacity, provide environmental resistance, affect the noise level of the belt, or influence the choice of manufacturing method. Such belts may also benefit from the methods and fabrics disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 2 is a schematic representation of a fabric weave according to an embodiment of the invention;

FIG. 4 is a schematic representation of another fabric weave according to an embodiment of the invention;

FIG. 5 is a schematic representation of another fabric weave according to an embodiment of the invention;

FIG. 6 is a schematic representation of another fabric weave according to an embodiment of the invention; and FIG. 7 is a schematic representation of another fabric weave according to an embodiment of the invention.

DETAILED DESCRIPTION

Figure 1:
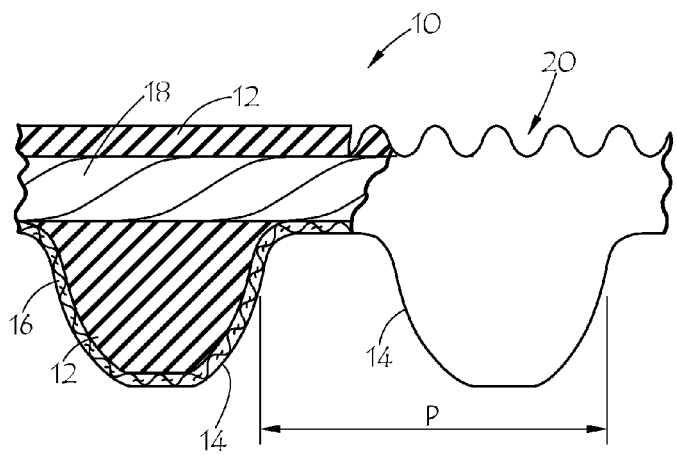
FIG. 1 is a partially fragmented side view of a toothed belt according to an embodiment of the invention.

Referring to FIG. 1, the belt 10 of the invention has a body 12 which may be of cast urethane belt material with belt teeth 14 formed of the body and spaced apart at a pitch P. The teeth are covered with a wear-resistant fabric 16 disposed along peripheral surfaces of the belt teeth. A tensile member 18 of helically spiraled cord is embedded in the belt body. A plurality of transversely oriented grooves 20 may optionally be formed in an outer layer of the belt. While not necessary, the grooves 20 may reduce belt weight and somewhat enhance belt flexibility.

Prior approaches to improving synchronous fabric were based on improving one feature at time, such as trying a higher performance fiber material, or increasing the fabric weight or density. The present invention arises from considering multiple design variables simultaneously and discovering that maximizing a parameter called "Fabric Tensile Toughness", particularly in the longitudinal direction for toothed belts, results in dramatically improved belt life. Herein, the weft direction of the fabric is used as the belt longitudinal direction, and the warp direction of the fabric is used as the belt transverse direction. However, it should be understood that these could be reversed, depending on the weaving process, if desired.

Herein, Fabric Tensile Toughness is modeled as a function of the yarn material properties, yarn construction, and the fabric construction. The model is basically a five-parameter model for each of the two weave directions of the fabric. The five parameters are yarn linear density, yarn ultimate elongation, yarn strength, yarn weave ratio, and yarn packing density.

Yarn linear density, ld, may be measured in dtex units, i.e., g/10,000 m. Yarn ultimate elongation, $\varepsilon$, is herein based on straightened yarn, i.e., texturized yarn is first pulled straight by a minimal load, then a tensile test completed on any conventional tensile tester. A normalized yarn strength, $\tau=f/ld$, is used in the model as characteristic of the yarn material. The yarn breaking force, f, may be likewise measured on any suitable tensile tester at the same time as ultimate elongation is measured (f may be in units of N/end). Yarn weave ratio, $\eta$, is defined as the yarn's straightened out length per unit length of flat, relaxed, woven fabric, i.e., the amount of straight yarn required to produce a unit length (or width) of fabric. Thus, the weave ratio, $\eta$=(yarn length straightened)/(fabric extent in direction of the yarn), and is dimensionless. Yarn packing density, n, is the number of yarn ends per unit width or length of fabric, which may be expressed as ends/25 mm.

These yarn parameters may be used to estimate fabric properties according to the following model. The total yarn weight, i.e., area density of one direction in the fabric, AD, for either the weft or the warp, is estimated as $AD=ld \cdot n \cdot \eta / 250$. The factor of 250 takes care of the units, namely, the factor of ten in dtex and the factor of 25 in the yarn packing. The fabric tensile strength, F, in a given direction (warp or weft) in units of N/25 mm is estimated as $F=\tau \cdot ld \cdot n$. The fabric ultimate elongation, $\varepsilon_u$, is estimated as $\varepsilon_u=(\varepsilon \pm 1)\eta - 1$.

Finally, the "Fabric Tensile Toughness," T, may be defined as the energy needed to break a unit area fabric (having units of mJ/mm$^2$ or N/mm), assuming a linear behavior for the fabric in tension. Thus, $T=\frac{1}{2} \cdot F \cdot \varepsilon_u$. This represents a triangle area formula based on the end point of the stress-strain curve. Substituting the yarn parameters gives the final 5-parameter model equation, $$T=\tau \cdot ld \cdot n \cdot [(\varepsilon+1)\eta - 1]/50.$$

Where again, the factor of 50 includes the 25-mm implied in the units of n. Note that F, $\varepsilon_u$ and therefore T can be measured directly on the fabric. Alternately, the area could be determined by integration of the stress-strain curve when measuring the fabric directly. Thus, the model can be tested by comparing calculated toughness from yarn properties with directly measured toughness of the fabric, again in each of the warp and weft directions. This comparison was carried out using four different timing belt fabrics ranging in weight from 359 g/m$^2$ to 535 g/m$^2$. The fabric weights, calculated from yarn properties, differed from 4% to 11% from the measured fabric weights. The weft strength of the fabric calculated from yarn properties differed from 1% to 8% from the measured weft strength. The warp strength of the fabric calculated from yarn properties differed from 18% to 22% from the measured fabric warp strength. The fabric elongation in the weft direction differed from 10% to 17% from the values calculated from the yarn properties.

Since the model for fabric toughness based on yarn properties agrees substantially with directly determined fabric values, it is considered that either approach may be used to characterize Fabric Tensile Toughness and to describe the invention.

The five parameters in the fabric model are easiest to determine from greige fabric, or by dissecting the greige fabric. The parameters and fabric properties may also be determined on fabric extracted from a finished belt product, although with more difficulty than for greige fabric. The parameters are subject to some change upon handling of the fabric during treating, belt making, and extracting. Herein, the state of fabric or yarn will be identified in the context when it is important. Generally, the parameter ranges in the claims or specification, unless otherwise indicated, are meant to include the possibility of such handling effects and therefore apply to both greige fabric or yarns and fabric or yarns as found in or extracted from a belt.

The five parameters of the model can be manipulated in various ways to achieve a desired Fabric Tensile Toughness. Yarn linear density, ld, may be selected at will or chosen from available yarn sizes. Yarn ultimate elongation, $\varepsilon$, and normalized yarn strength, $\tau$, are primarily determined by the choice of yarn material(s). To a lesser extent, the yarn construction (twist, blending, hybridization, etc.) may also influence $\varepsilon$ and $\tau$. Any known, suitable fiber material may be incorporated into the yarn and then the elongation and strength determined for use in the model. The weave ratio, $\eta$, is highly influenced by the processing of the yarn, especially the use of texturing. A highly textured yarn will have a higher weave ratio. Weaving parameters and fabric post processing will also affect the weave ratio by affecting the fabric shrinkage, the tortuosity of the yarn in the fabric, etc. Yarn packing density, n, may be chosen at will within various practical limits related to yarn size, fabric thickness, weaving limitations, etc.

According to various embodiments, it is advantageous to choose the parameters of the yarn and fabric in the belt longitudinal direction, for toothed belts, so that the Fabric Tensile Toughness, as defined above, is as large as possible. There will be other constraints that limit the choices of parameters for the fabric, namely geometrical constraints on the belt and the fabric. For example, the thickness of the fabric may be constrained by the desired pitch diameter of the belt, pulleys, and system in which the belt is to be applied. These dimensional relationships and constraints are well known in the art. For an extensive discussion of fabric thickness and pitch diameter, see for example, U.S. Pat. No. 8,932,165 which is incorporated herein by reference.

Thus, for a 14-mm pitch toothed belt of conventional system design, it is advantageous for the Fabric Tensile Toughness to be greater than or equal to 60 mJ/mm$^2$ or greater than or equal to 80 N/mm, or in the range of 90 or more mJ/mm$^2$ in one or both of the warp and weft directions. The target level of Fabric Tensile Toughness may depend on the fiber material of the warp or weft. For example, for a high tenacity material with yarn tensile strength greater than about 0.050 N/dtex, it may be advantageous for the Fabric Tensile Toughness to be greater than or equal to 80 N/mm, or in the range of 90 or more mJ/mm$^2$. For a medium tenacity material with yarn tensile strength about 0.030 to 0.049 N/dtex, it may be advantageous for the Fabric Tensile Toughness to be greater than or equal to 60 N/mm, or in the range of 70 or 80 or more mJ/mm$^2$.

Because there are five parameters, there are many possible fabric constructions that will meet this target. The examples below will provide some possible illustrations meeting the target.

Table 1 illustrates use of the model to provide two improved timing belt fabrics for a 14-mm pitch timing belt. The comparative example (Comp. Ex. 1) represents a conventional fabric for 14-mm belts in which the texturized weft yarns are of medium tenacity nylon 66. The inventive example (Ex. 2) utilizes high-tenacity nylon 66 in the weft yarns, resulting in a 45% increase in the normalized yarn tensile strength. There are also increases in yarn weave ratio and packing, so that the increase in three parameters more than balances smaller decreases in yarn linear density and yarn ultimate elongation, resulting in a dramatic 106% increase in Fabric Tensile Toughness in the weft direction. The inventive example Ex. 3 utilizes the same materials and basic weave as Comp. Ex. 1, but with a higher weft density.

Note that Ex. 2 has a decreased warp yarn linear density, which is primarily responsible for the decreased warp direction fabric properties. In the case of the 14-mm toothed belt, this permits a balance of the fabric thickness as required to maintain an appropriate pitch line or cord position in the belt. It thus may be advantageous to choose the weft to warp weight ratio (or AD ratio) to be greater than about 5.2 or greater than 5.5 for some belt applications. It may also be advantageous to greatly texturize the weft yarn and lightly texture the warp yarn or not texture the warp yarn, for some belt applications.

Figures 2, 4, 5, 6, 7:
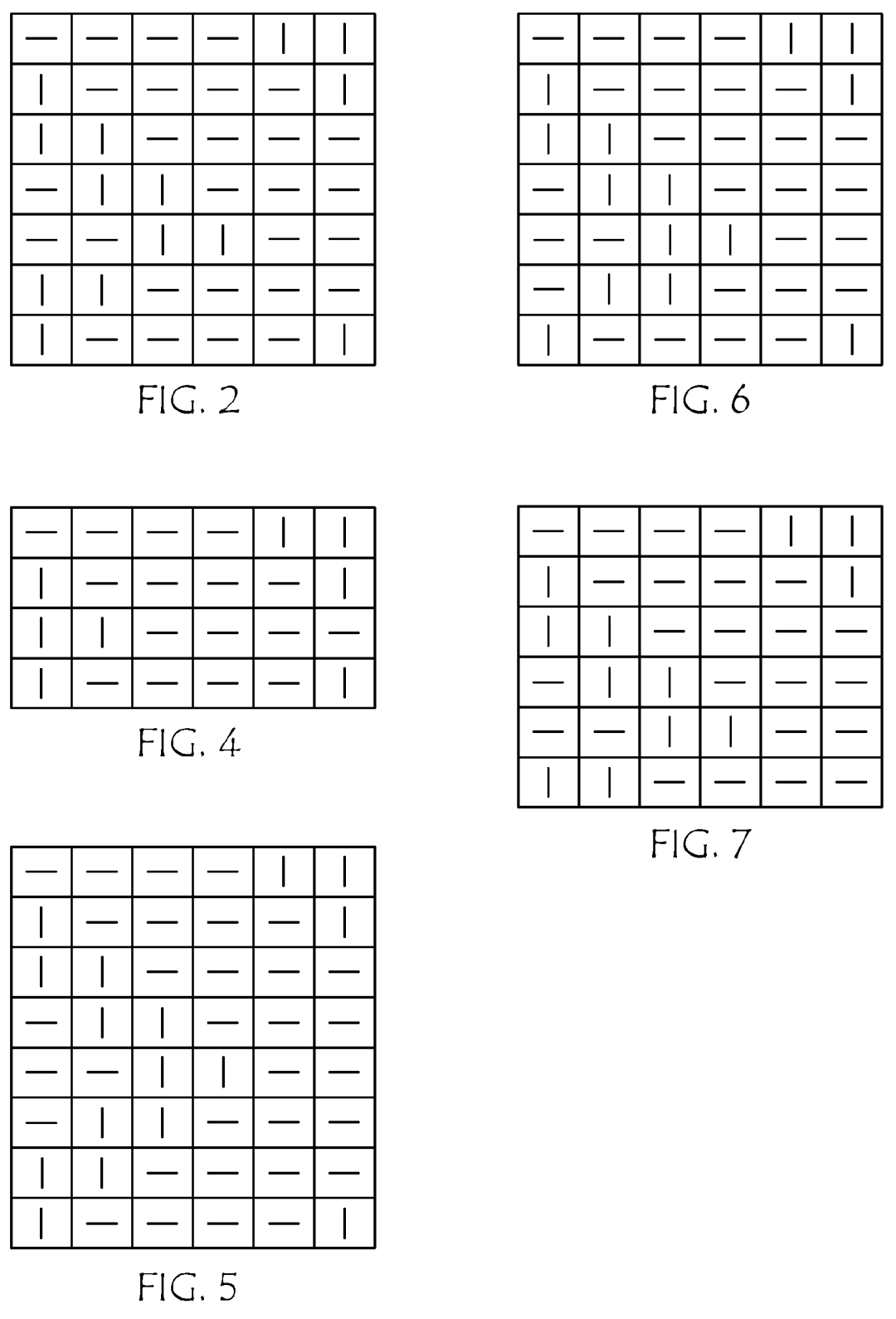

Cast polyurethane toothed belts of 14-mm pitch, with GT® tooth profile with carbon cord (such as disclosed in U.S. Pat. No. 5,807,194 to Knutson and Dodson), were built and tested on a load life test. The three fabrics of Table 1 were used. Each fabric was preformed to conform to the mold profile with a polyethylene laminate (which provides a low coefficient of friction such as disclosed in U.S. Pat. No. 3,964,328 to Redmond, Jr.) so that the fabric was not pre-stretched in the belt. In other words the weave ratio defined herein was the same for the flat, relaxed fabric as for the fabric as found in the final belt. The fabric weave of the Comp. Ex. 1 was a two-layer, nylon, square weave such as disclosed in U.S. Pat. No. 5,362,281 to Dutton and Conley. The inventive Ex. 2 model parameters were implemented in a single layer fabric woven in a dobby weave which could also be considered a chevron, or zig-zag, 4×2 broken twill pattern. The weave pattern of Ex. 2 is illustrated in FIG. 2, in which the weft direction is horizontal, and the warp direction is vertical.

The 14-mm load life test is carried out on a two point tester. Both driven and driver pulleys have 32 grooves. The tester is run at 1750 rpm and 73 HP load. The number of belt teeth may be variable, but the test was run on belts with 140 and 125 teeth. The belt width may be variable, but the test was run on belts with widths of 20 mm, 16 mm, and 14 mm. Thus, three levels of load were realized: 2.66, 3.42, and 3.91 kg/mm/tooth, respectively. The results are shown in the graph of FIG. 3.

Figure 3:
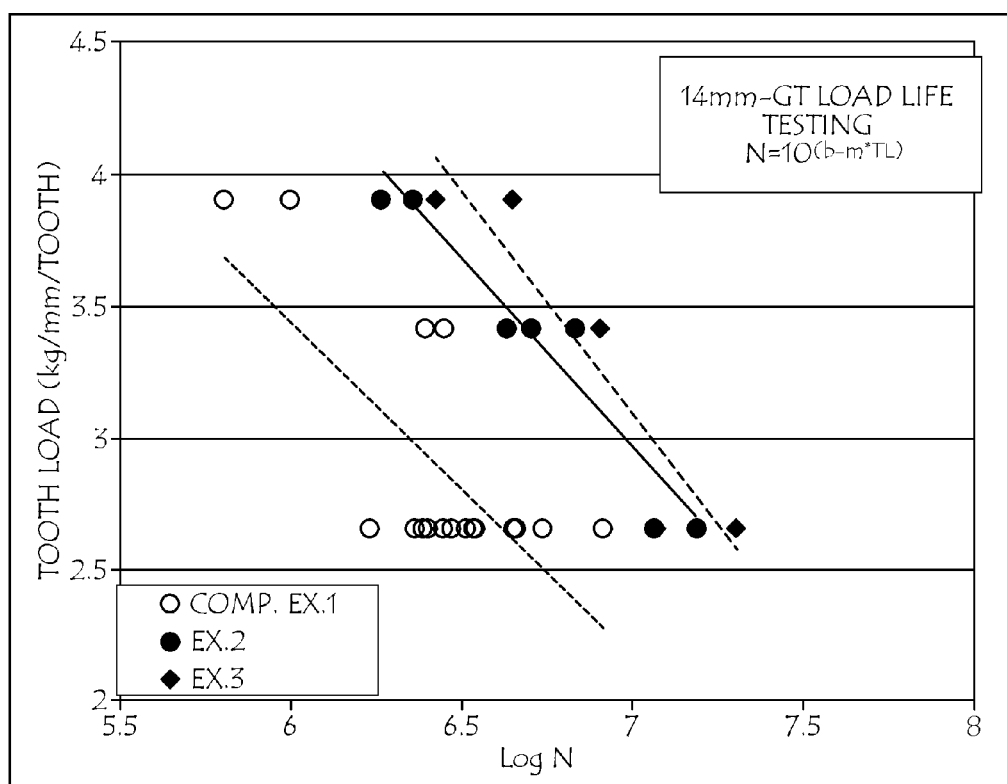
FIG. 3 is a graph of load-life belt test data for three example belts.

The net result from FIG. 3 is that, utilizing the tougher fabrics, the load life of the belt is increased 3-5 fold, the load capacity is also increased by approximately 15-25%. This means the belt with tougher fabric lasts much longer than conventional design. This also means that the belt width could be reduced to provide a more compact and lighter belt/sprocket design while maintaining the same life. This increases potential market applications to include higher load applications that are currently served only by chains. Additionally, the fabric design maintains the appropriate fit of the belt with the current sprockets and belt profile and can be used in the current fabric, jacket and belt manufacturing processes.

It should be noted that there are many fabric constructions that could match Ex. 2 in terms of matching the five parameters of the model. FIGS. 4-7 illustrate various alternative weaves, all variations of a zig-zag, 4×2 twill pattern. In addition, other twill patterns could be applied with the same yarn parameters of the model to achieve the target Fabric Tensile Toughness. For example, 5×2, 2×2, 3×2, 3×1, 2×1 and so on, and also the related twill derivatives such as herringbone, zigzag, broken and chevron. In short, there are many possible twill fabric constructions that will meet this target. Likewise, there are many other fabric constructions or styles that may be used to meet a target Fabric Tensile Toughness. Among these are plain and satin weaves and their derivatives such as oxford, basket, Bedford cord, pique and the like; backed fabrics, double, triple and multiple fabrics; leno fabrics and the like. Backed fabrics have a second set of either warp or weft yarns, while double, triple or multiple fabrics have two, three or multiple sets of both warp and weft yarns, respectively.

Ex. 3 provides another example of application of the model to fabric improvement for synchronous belts. The fabric of Ex. 3 has the same double layer weave structure of the Comp. Ex. 1, and the same medium-tenacity nylon 66 weft material, but adjusted in the density of weft threads and yarn size in order to increase the Fabric Tensile Toughness in the weft direction by 36%. The % change in the fabric variables and properties of Ex. 3 over Comp. Ex. 1 is also shown in Table 1. Belts with Ex. 3 fabric were constructed in the same way as for Ex. 2 and were tested in the same way as Ex. 2. The results are also shown in FIG. 3. It can be seen that the performance of Ex. 3 is slightly improved over Ex. 2, and again much improved over Comp. Ex. 1. This shows that even a modest improvement in Fabric Tensile Toughness (e.g. just 36%) can lead to a very dramatic improvement in belt performance (~3×). It should also be noted that other factors will have an impact on belt performance as well, and this model may not necessarily account for all such factors. Such factors may include fabric weave style, fabric thickness, etc. In comparing Ex. 2 versus Ex. 3, for example, there is a significant difference in weave type, since Ex. 2 is a broken or zigzag twill weave, and Ex. 3 is a double-layer square-weave fabric. In addition, Ex. 3 is directionally thicker than Ex. 2 which may result in a positive effect such as described in U.S. Pat. No. 8,932,165. Nevertheless, by considering Fabric Tensile Toughness, one may be able to improve on any given fabric for belt use according to the model, all other things being equal.

applications where both warp and weft need to be improved, this model provides a method of doing that.

Table 2 illustrates the application of the model to improve a fabric used in 8-mm pitch and 9.525-mm pitch synchronous belts. Comp. Ex. 4 is a 2×2 twill fabric made of high-tenacity nylon 66 yarn, textured in the weft direction. Ex. 5-7 illustrated improved fabric constructions based on the model calculations. Ex. 5 achieves a 2× higher Fabric Tensile Toughness in the weft direction by using the same nylon 66 material, but increasing the weave ratio and packing density, and thus increasing the fabric tensile strength and elongation. Ex. 6 achieves a similar increase in Fabric Tensile Toughness in the weft direction by increasing the material strength of the weft yarn modestly and also increasing somewhat the packing density and weave ratio. Ex. 7 achieves a similar increase in Fabric Tensile Toughness in the weft direction solely by increasing the material strength of the weft yarn, i.e. by a change in material. Thus, the model provides guidance and multiple approaches to improving a tooth cover fabric for synchronous belts by increasing the Fabric Tensile Toughness in one or both directions.

Thus, for a 8-mm or 9.525-mm pitch toothed belt of conventional system design, it is advantageous for the Fabric Tensile Toughness to be greater than or equal to 60 mJ/mm$^2$ or greater than or equal to 80 N/mm, or in the range of 90 or more mJ/mm$^2$ in one or both of the warp and weft directions. The target level of Fabric Tensile Toughness may depend on the fiber material of the warp or weft. For example, for a high tenacity material with yarn tensile

TABLE 1

| Component | Parameter | Comp. Ex. 1 | Ex. 2 | % change | Ex. 3 | % change |
|---|---|---|---|---|---|---|
| Weft | Yarn linear density (dtex) | 660 | 468 | −29% | 660 | 0% |
| | Yarn ultimate strain (mm/mm) | 0.302 | 0.251 | −17% | 0.340 | 13% |
| | Yarn breaking force (N/end) | 25.45 | 26.1 | 3% | 26.66 | 5% |
| | Yarn tensile strength (N/dtex) | 0.039 | 0.056 | 45% | 0.040 | 4% |
| | Yarn weave ratio | 1.73 | 2.3 | 33% | 1.71 | −1% |
| | Packing density (ends/25 mm) | 70 | 94 | 34% | 88 | 26% |
| | Area density (g/m$^2$) | 320 | 405 | 27% | 397 | 24% |
| | Fabric ultimate elongation (%) | 125 | 188 | 50% | 129 | 3% |
| | Fabric tensile strength (N/25 mm) | 1782 | 2453 | 38% | 2346 | 32% |
| | Fabric Tensile Toughness (mJ/mm$^2$) | 44.6 | 92.1 | 106% | 60.6 | 36% |
| Warp | Yarn linear density (dtex) | 235 | 156 | −34% | 235 | 0% |
| | Yarn ultimate strain (mm/mm) | 0.184 | 0.236 | 28% | 0.222 | 21% |
| | Yarn tensile strength (N/end) | 13.83 | 8.7 | −37% | 13.8 | 0% |
| | Yarn tensile strength (N/dtex) | 0.059 | 0.056 | −5% | 0.059 | 0% |
| | Yarn weave ratio | 1.11 | 1.1 | −1% | 1.11 | 0% |
| | Packing (ends/25 mm) | 105 | 103 | −2% | 104 | −1% |
| | Area density (g/m$^2$) | 110 | 71 | −35% | 109 | −1% |
| | Fabric ultimate elongation (%) | 31 | 36 | 14% | 36 | 16% |
| | Fabric tensile strength (N/25 mm) | 1452 | 896 | −38% | 1435 | −1% |
| | Fabric Tensile Toughness (mJ/mm$^2$) | 9.1 | 6.4 | −29% | 10.2 | 12% |
| Fabric | Fabric total area density (g/m$^2$) | 429 | 475 | 11% | 532 | 24% |
| Weft/Warp Ratio | Area density | 2.9 | 5.7 | 96% | 3.7 | 28% |
| | Fabric ultimate elongation | 4 | 5.2 | 31% | 3.6 | −10% |
| | Fabric tensile strength | 1.2 | 2.7 | 123% | 1.6 | 33% |
| | Fabric Tensile Toughness | 4.9 | 14.3 | 192% | 5.9 | 20% |

It should be noted that in other applications, this approach may permit both weft and warp directions to be improved in terms of fabric toughness. The toothed (synchronous) belt performance is dominated by the weft direction (i.e., the direction oriented in the longitudinal belt direction) so the warp properties can be traded off as in Ex. 2 above, thus maintaining other constraints such as fabric thickness. For strength greater than about 0.050 N/dtex, it may be advantageous for the Fabric Tensile Toughness to be greater than or equal to 80 N/mm, or in the range of 90 or more mJ/mm$^2$. For a medium tenacity material with yarn tensile strength about 0.030 to 0.049 N/dtex, it may be advantageous for the Fabric Tensile Toughness to be greater than or equal to 60 N/mm, or in the range of 70 or 80 or more mJ/mm$^2$.

TABLE 2

| Parameter[1] | Comp. Ex. 4 | Ex. 5 | % change | Ex. 6 | % change | Ex. 7 | % change |
|---|---|---|---|---|---|---|---|
| Yarn linear density (dtex) | 468 | 624 | 33% | 624 | 33% | 468 | 0% |
| Yarn ultimate strain (mm/mm) | 0.24 | 0.24 | 0% | 0.24 | 0% | 0.24 | 0% |
| Yarn tensile strength (N/dtex) | 0.053 | 0.053 | 0% | 0.065 | 23% | 0.106 | 100% |
| Yarn weave ratio | 1.88 | 2.1 | 12% | 2 | 6% | 1.88 | 0% |
| Packing (end/25 mm) | 72 | 90 | 25% | 80 | 11% | 72 | 0% |
| Area density/weight (g/m2) | 253 | 472 | 86% | 399 | 58% | 253 | 0% |
| Fabric ultimate elongation (%) | 133 | 160 | 20% | 148 | 11% | 133 | 0% |
| Fabric tensile strength (N/25 mm) | 1786 | 2976 | 67% | 3245 | 82% | 3572 | 100% |
| Fabric Tensile Toughness (mJ/mm2) | 47.5 | 95.5 | 101% | 96 | 102% | 95.1 | 100% |

[1]only weft properties are listed.

The fabrics described herein may be treated with size, adhesive treatment, laminate film or rubber coating, or combinations thereof. Such treated fabric may be referred to as "jacket" herein. Typically, the jacket may include a thermoplastic laminate on the outer surface of the belt for use in cast polyurethane belts. Typically the jacket will include an adhesive dip coating and a rubber coating on the inside surface for use in rubber or vulcanized elastomer belts.

Other types of power transmission belts besides toothed belts, including V-belts, flat belts, and multi-V-ribbed belts, often include a fabric covering on one or more surfaces, in particular on pulley contact surfaces, or embedded in the belt body. Such fabrics can, in various applications, increase the wear resistance, stop or inhibit the growth of cracks in rubber used in the body of the belt, enhance the belt strength or load capacity, provide environmental resistance, affect the noise level of the belt, or influence the choice of manufacturing method. Such belts may also benefit from the methods and fabrics disclosed herein.

The belts of the present invention may be made by any known belt making method of manufacture utilizing the tough fabric disclosed herein. Any suitable tensile cord or elastomeric belt body composition may be used.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A toothed power transmission belt comprising a tooth cover comprising a woven fabric having half the product of weft elongation and weft strength (i.e. the Fabric Tensile Toughness as defined herein) greater than 60 mJ/mm$^2$.

2. The toothed power transmission belt according to claim 1 wherein said Fabric Tensile Toughness in the weft direction is greater than or equal to 60 mJ/mm$^2$ when the weft yarn has a breaking strength of 0.03 to 0.049 N/dtex or is medium-tenacity nylon 66; or is greater than about 80 mJ/mm$^2$ when the weft yarn has a breaking strength of 0.05 N/dtex or greater or is high-tenacity nylon 66.

3. The toothed power transmission belt of claim 2 wherein the tooth pitch is nominally 14 mm.

4. The toothed power transmission belt of claim 3 further comprising a belt body comprising cast polyurethane.

5. The toothed power transmission belt of claim 4 further comprising a tensile cord of carbon fiber.

6. The toothed power transmission belt of claim 3 wherein the fabric has a zig-zag twill weave.

7. The toothed power transmission belt of claim 6 wherein the fabric has a 4×2 twill weave.

8. The toothed power transmission belt of claim 3 wherein the fabric has a two-layer weave structure.

9. The toothed power transmission belt according to claim 1 comprising: a cast polyurethane body, a carbon fiber tensile cord embedded therein, and a tooth fabric with the properties of Ex. 2 as shown in Table 1 herein.

10. The toothed power transmission belt according to claim 1 comprising: a cast polyurethane body, a carbon fiber tensile cord embedded therein, and a tooth fabric with the properties of Ex. 3 as shown in Table 1 herein.

11. The toothed power transmission belt according to claim 1 comprising: a cast polyurethane body, a carbon fiber tensile cord embedded therein, and a tooth fabric having the properties of Ex. 5, Ex. 6, or Ex. 7 as shown in Table 2 herein.

12. The toothed power transmission belt according to claim 1 comprising: an elastomeric body, a tensile cord embedded therein, and a tooth fabric having the properties of Ex. 2 or Ex. 3 as shown in Table 1 herein, or of Ex. 5, Ex. 6, or Ex. 7 as shown in Table 2 herein.

13. The toothed power transmission belt of claim 12 wherein the elastomeric body is a vulcanized rubber or a thermoplastic elastomer or a cast elastomer.

14. The toothed power transmission belt of claim 12 in the form of a toothed belt, a flat belt, a multi-v-ribbed belt or a V-belt.

15. The toothed power transmission belt of claim 12 wherein the weft direction of the fabric is arranged in the longitudinal direction of the belt.

16. The toothed power transmission belt of claim 1 wherein the fabric has a ratio of weft weight to warp weight greater than 5.2; and a highly textured weft with a lightly textured or non-textured warp.

17. A method of improving a toothed power transmission belt having a known tooth cover fabric comprising: selecting a different fabric having a higher Fabric Tensile Toughness than said known tooth cover fabric; and orienting said different fabric so the direction of highest Fabric Tensile Toughness is oriented in the longitudinal direction of the belt; wherein the Fabric Tensile Toughness of the different fabric is 60 $mJ/mm^2$ or more.

* * * * *